G. H. PEABODY.
Cotton-Seed Huller.

No. 92,997.

Patented July 27, 1869.

Witnesses

Inventor
George H. Peabody

United States Patent Office.

GEORGE H. PEABODY, OF NEW YORK, N. Y.

Letters Patent No. 92,997, dated July 27, 1867.

---

IMPROVEMENT IN COTTON-SEED HULLERS.

---

The Schedule referred to in these Letters Patent and making part of the same.

---

*To all whom it may concern:*

Be it known that I, GEORGE H. PEABODY, of the city, county, and State of New York, have invented a new and improved Machine or Mill for Hulling Cotton-Seed; and I do hereby declare that the following is a full, clear, and exact description of the construction and operation of the same, reference being had to the accompanying drawings, making a part of this specification, in which—

Figure 1:
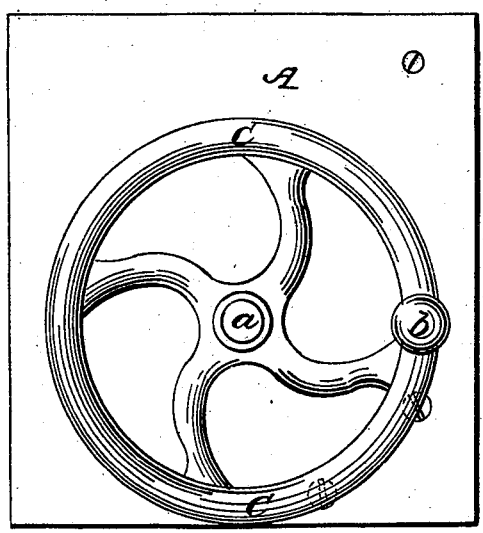
Figure 1 is a side elevation.
Figure 2:
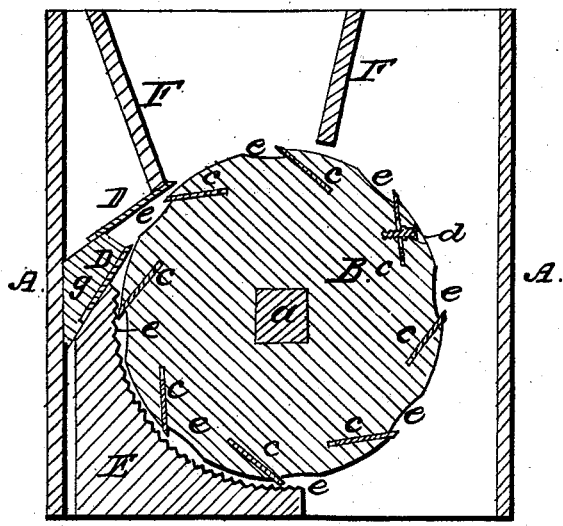
Figure 2 is a section.

The object of this invention is to utilize the waste cotton-seed, and consists of a revolving wheel or cylinder, having the periphery thereof provided with concave receptacles, in combination with adjustable and fixed knives, and the segment of a circular block, having a corrugated or serrated surface, so as to hull the seed without bruising it, and thus avoid the liability of the seed becoming rancid.

I construct my machine as follows:

A is a box, of a rectangular shape, open above and below, and having the revolving cylinder B supported on an axle, $a$, passing through the sides of the box, the axle having a balance-wheel, C, on the end thereof, provided with a handle, $b$, with which to turn the cylinder.

At equal distances apart, around the periphery of the cylinder, are arranged the adjustable knives $c$.

The knives are inserted in cuts or grooves, made so as to give them a suitable inclination forward, and are fitted tightly therein, with a sufficient space left back of the knives for the insertion of wedge-shaped pins for adjusting them, so as to increase or diminish the cutting-surface of the cylinder, as may be required; or if preferable it may be done by a set-screw, $d$, passed through a slot in the knife, the head of the screw being countersunk in the cylinder. Forward of each knife, a concavity, $e$, is made across the edge of the cylinder.

D D are the fixed knives, passed through cuts or grooves in the sides of the box, and are arranged one above the other, and in such a position as to present, with the knives of the cylinder, a proper cutting-surface to the seed.

These knives may be adjusted the same as those of the cylinder; that is, by the insertion of pins back of them, and in connection with the others may be easily removed and sharpened at any time when necessary.

The space between the fixed knives is closed by a piece, $g$, to prevent the seed falling below.

E is the block, having a corrugated surface, and fastened by screws to the sides, and in the bottom forward corner of the box.

F F are pieces let into grooves in the sides of the box, forming a hopper-receptacle for the seed. Thus, by pouring the seed therein, and turning the crank of the balance-wheel, the seed will be hulled by their passing between the fixed knives and those of the cylinder, and over the corrugated surface of the block, and such seed as adhere to pieces of the shells or hulls may be separated therefrom by being shaken screen. But where there is an abundance of seed, as in the South, it will hardly be necessary to go to this trouble.

As it will require a less quantity of seed to feed cattle with than corn, the same quantity of seed containing more nutriment than the same quantity of corn, it will be found very desirable for the planter to economize the use of his corn, and use almost altogether the seed instead thereof.

Although there is a machine or mill, whose cylinder has a cutting-edge, yet it is so constructed in connection with the cutting-edge of its concave receptacle as to bruise the seed, and so with another machine whose cylinder has no regular knives, but projections on the periphery thereof, which, in breaking the shells, tend to bruise the seed also.

Having thus fully described my invention,

What I claim therein as new, and desire to secure by Letters Patent, is—

The concave receptacles $e$, in combination with the adjustable and fixed knives $c$ and D D, substantially in the manner and for the purpose as herein set forth.

GEORGE H. PEABODY.

Witnesses:
DAVID A. BURR,
CHAS. C. WILSON.